Patented June 16, 1925.

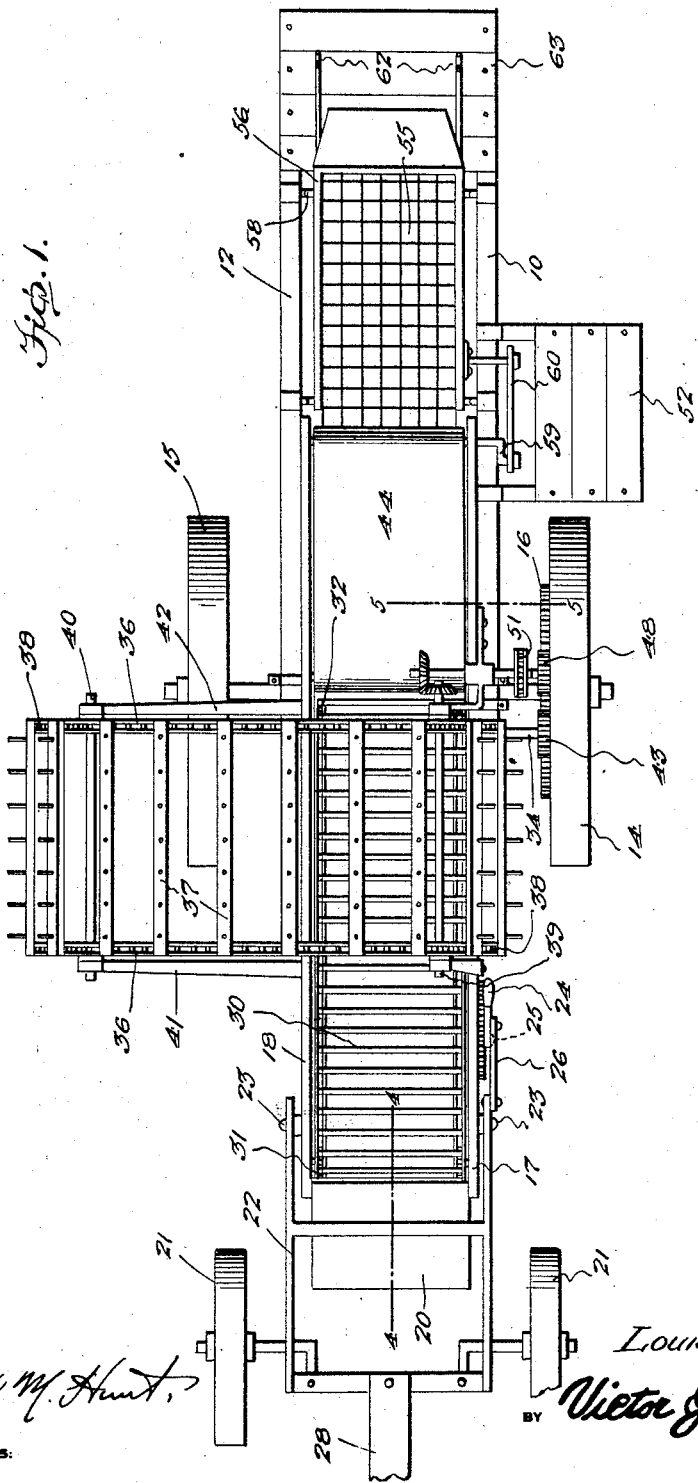

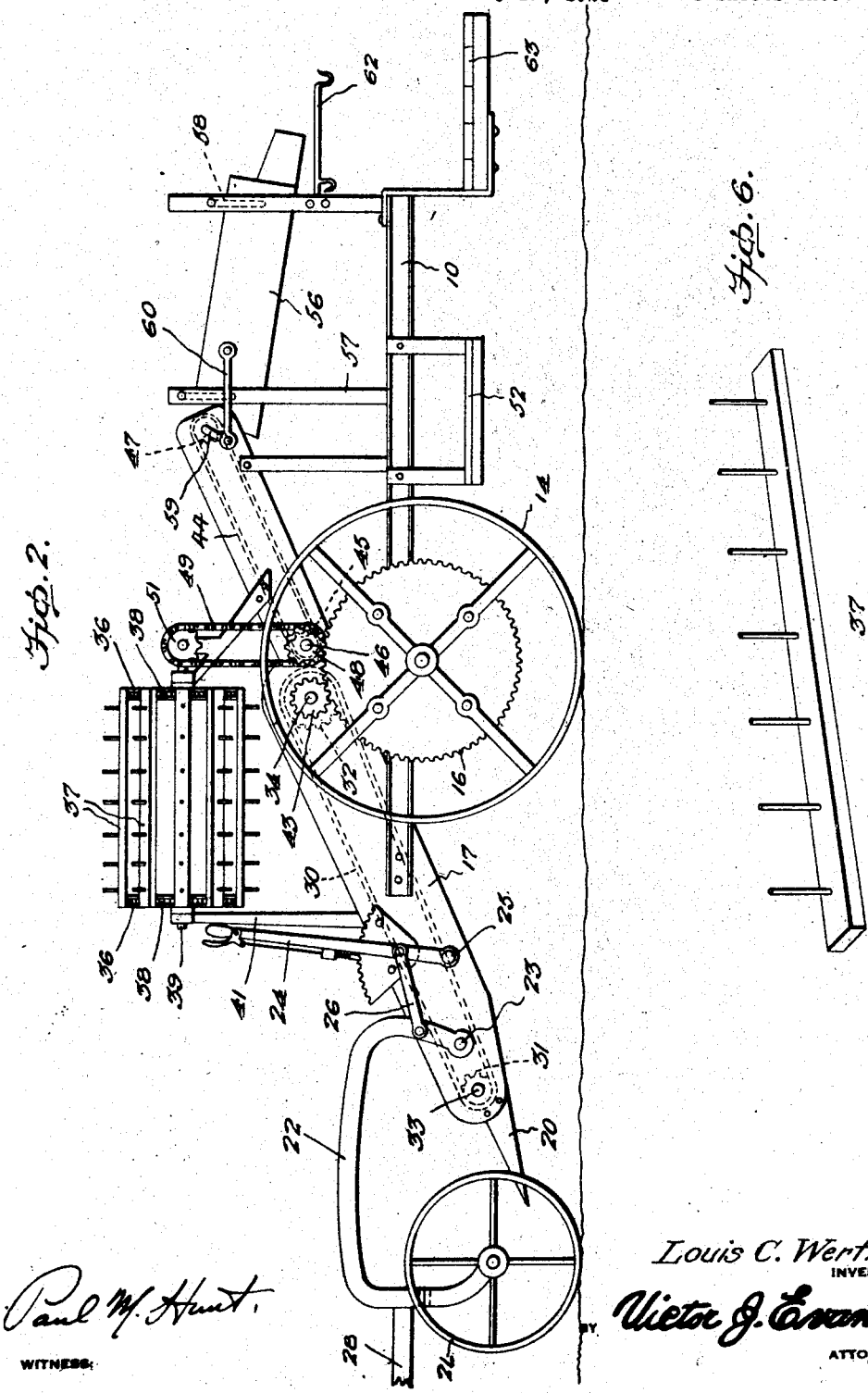

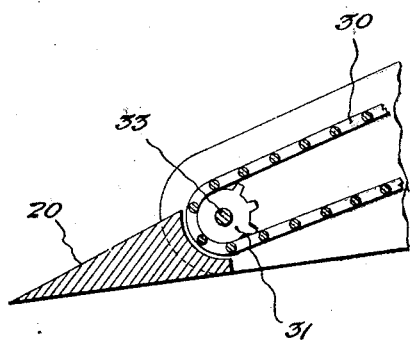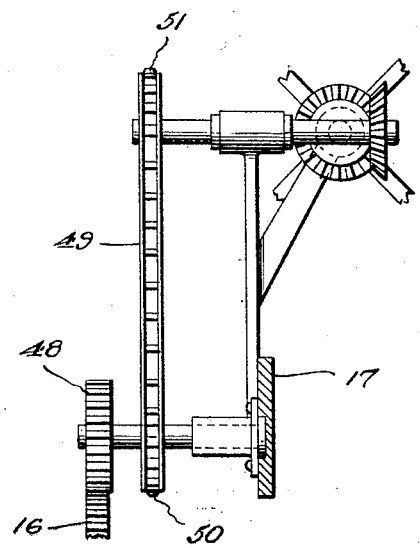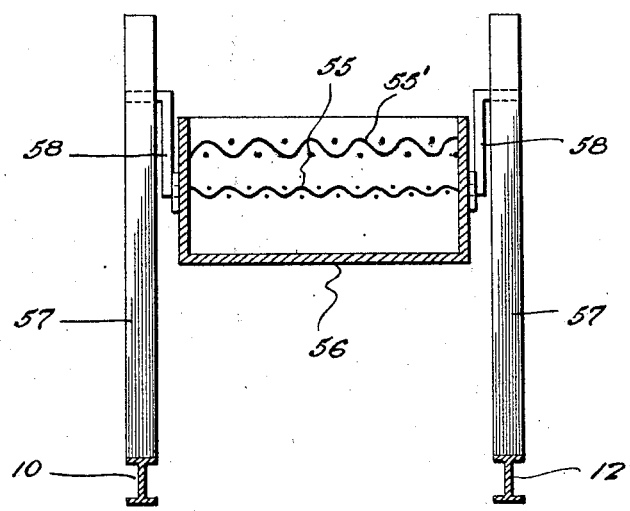

1,542,750

UNITED STATES PATENT OFFICE.

LOUIS C. WERTZ, OF CENTER, COLORADO.

POTATO-DIGGING MACHINE.

Application filed July 19, 1921. Serial No. 485,908.

*To all whom it may concern:*

Be it known that I, LOUIS C. WERTZ, citizen of the United States, residing at Center, in the county of Saguache and State of Colorado, have invented new and useful Improvements in Potato-Digging Machines, of which the following is a specification.

This invention relates to a potato digging machine and the object is to provide a device of this type which may be efficiently operated by two men, and by the use of which a very material saving in the cost of harvesting a crop may be realized.

A further object is to provide a machine which shall include, in addition to the digging device per se, a conveyor, and an endless moving element forming a type of rake by means of which vines are removed as the potatoes are carried rearwardly by the conveyor.

A still further object is the provision in connection with the foregoing, of a power operated traveling element receiving the potatoes from the conveyor, and serving to continue their movement toward the rear while spread out to permit the operator to pick out clods of earth, stones or other foreign substances, the traveling element last named then discharging the product to a shaking or vibrating screen and thence into sacks.

With the foregoing and other objects in view, the invention consists in the novel construction, combination and arrangement of elements hereinafter described and claimed, it being understood that modifications or alterations in the construction may be made within the scope of the claims, without departing from the spirit of the invention.

In the drawings, Figure 1 is a top plan view of the machine; Figure 2 is a side elevation; Figure 3 is a transverse section through a screen frame or box, constituting a modification of the structure at the right of Figure 1; Figure 4 is a section of line 4—4 of Figure 1; Figure 5 is a section on line 5—5 of Figure 1; Figure 6 is a perspective view of a slat of the upper transversely movable element of Figures 1 and 2.

In carrying out my invention, I provide a main frame including side bars 10 and 12, this frame being carried by ground wheels 14 and 15, the wheels 14 carrying a large gear wheel 16 for driving the various moving elements referred to below.

The conveyor frame includes side bars 17 and 18, and the lower forward end of this frame carries a digging device 20.

Caster wheels 21 are mounted at the forward portion of the arch or yoke 22, and the latter is pivoted at the points 23 to side bars 17 and 18. In order to vary the depth of travel of the digging device, I provide a lever 24 pivoted at 25 and having connection by means of a link 26 with the arch 22. A tongue 28 affords means for connecting the machine with a tractor, although it may be horse drawn if desired.

A conveyor 30 passes around the lower sprocket wheels 31 and upper sprocket wheels 32, the former being on the shaft 33 and the latter on the shaft 34, and the conveyor being inclined upwardly and rearwardly as shown.

In order to remove the vines from the potatoes as they are being elevated by the conveyor and moved rearwardly I provide a traveling element including chain or chains 36, slats 37 and projecting elements or spikes carried by the slats, the whole constituting a type of power operated rake or viner. The chain or chains pass around sprocket wheels such as 38 on shafts 39 and 40, the latter being mounted in suitable bearings in a forward frame 41 and a rear frame 42.

A pinion 43 on the shaft 34 meshes with the gear wheel 16 and serves to drive the conveyor 30.

Another traveling device 44 receives the potatoes from the conveyor 30, and serves to continue their rearward movement. This traveling device 44 passes around sprocket wheels such as 45 on the shaft 46 at the lower end, or immediately adjacent to the upper end of the conveyor 30. The upper sprocket wheels such as 47 serve an obvious purpose, the drive being effected through a pinion 48 on the shaft 46 this pinion meshing with gear wheels 16. The drive for the rake or viner is through the chain 49 passing around the small sprocket wheels 50 and 51. As the product passes over the traveling element 44, termed a sorter, the clogs of earth and stones, or other foreign substances are picked out by hand, the operator standing on a platform 52, mounted at the sides of the main frame.

The shaking or vibrating screen 55, in a frame 56 receives the potatoes after they are discharged by the traveling element 44. This device is supported by suitable means, as by means of uprights 57 and is directly mounted, or connected with these uprights by means of rocker arms 58. Movement is imparted to the screen by means of suitable devices such as a crank and pitman connection, the crank 59 being on a shaft and the pitman being designated 60 and connected with the crank.

The sacks for receiving the potatoes are suspended from the devices 62 mounted as shown and extending over the rear platform 63, on which the operator handling the sacks performs his work.

It will be observed that the potatoes are removed from the ground by the digging device, carried upwardly and rearwardly, the vines being removed by the power operated rake or viner, that the product is then carried in the front of an operator who removes the foreign substances and the potatoes are subjected to the action of a vibrating screen and discharged directly into the sack—all portions of the operation being continuous and automatic except the step performed manually after the vines have been removed.

The device for removing the vines, travelling transversely of the direction of movement of the conveyor 30, extends beyond one side of the frame for a distance of say three feet, in order to discharge the vines at a point where they will be free of the machine. Figure 2 shows a converging space between conveyor 30 and the slats of the device for removing the vines, so that the vines will first be caught by their tops and the movement of the conveyor will move them rearwardly into a narrow space, as between jaws, and tear them from the potatoes.

In the modification shown in Fig. 3, the screen 55 includes the usual mesh sufficient to permit the very small and useless potatoes to pass through, an upper grading device or screen of much larger mesh, designated 55', serving to separate the largest potatoes and convey them to sacks separate from those receiving the product from the lower screen.

Having described the invention, I claim:

1. In a machine of the class described, a main frame, a second frame mounted thereon and extending upwardly and rearwardly with reference thereto, a conveyor mounted in the second frame and moving rearwardly, means for driving the conveyor, a transversely movable endless element mounted above the conveyor, means for driving said element, and a traveling element for receiving material from the conveyor said transversely movable element including toothed slats extending longitudinally of the conveyor and movable perpendicularly thereof, and at an angle with reference to the plane of its upper surface, providing a space converging rearwardly toward the upper end of the conveyor.

2. In a machine of the class described, a main frame, a frame mounted thereon and extending upwardly and rearwardly with reference thereto, a conveyor mounted in the second named frame, an endless movable device for removing vines from material on the conveyor, and a traveling element for receiving material from the conveyor, said endless device for removing vines presenting an extended surface longitudinally of the conveyor, and the conveyor having its upper run converging with reference to said extended surface.

In testimony whereof I affix my signature.

LOUIS C. WERTZ.